Feb. 9, 1971 W. GULDENFELS 3,561,059
APPARATUS FOR CENTRIFUGALLY MOLDING TUBES OR
REINFORCED PLASTIC MATERIAL
Filed Oct. 10, 1967 3 Sheets-Sheet 1

INVENTOR.
WILLY GULDENFELS
BY
McGlew & Toren
ATTORNEYS

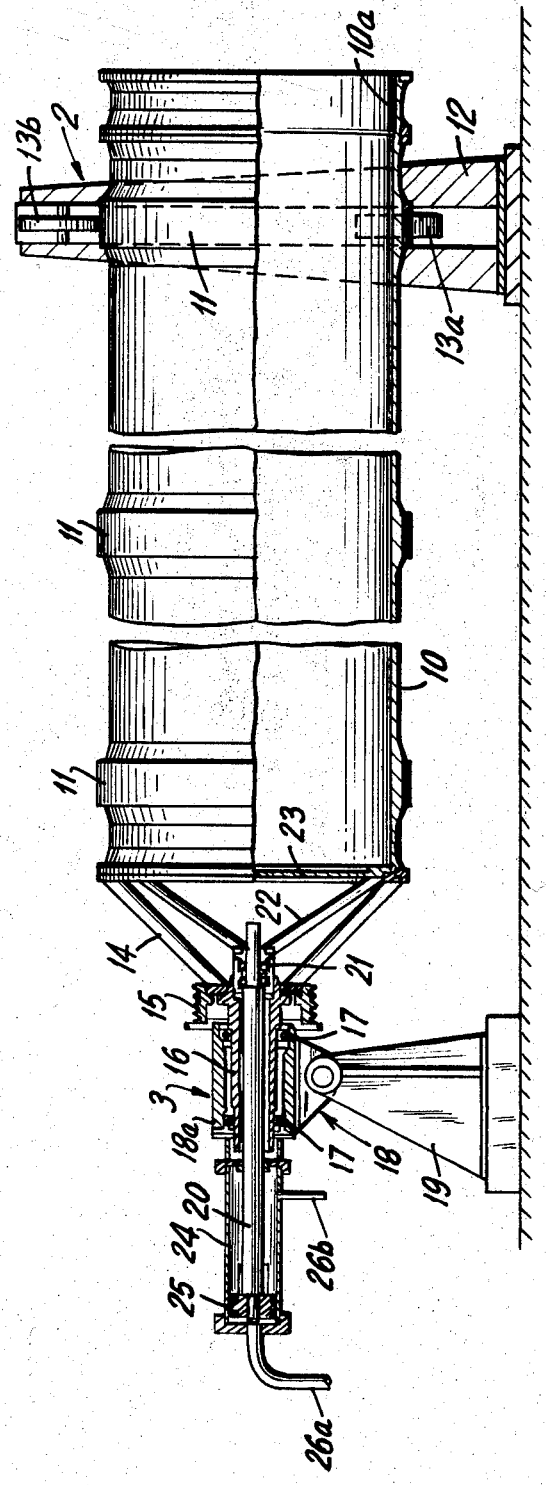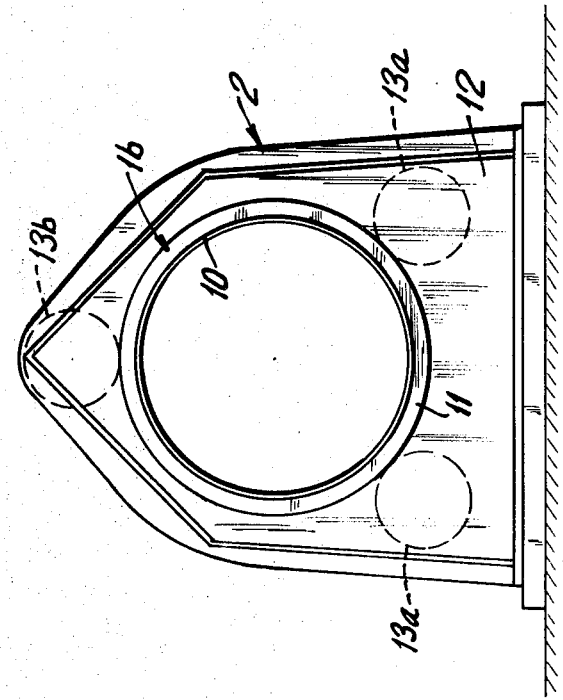

Feb. 9, 1971 W. GULDENFELS 3,561,059
APPARATUS FOR CENTRIFUGALLY MOLDING TUBES OR
REINFORCED PLASTIC MATERIAL
Filed Oct. 10, 1967 3 Sheets-Sheet 3
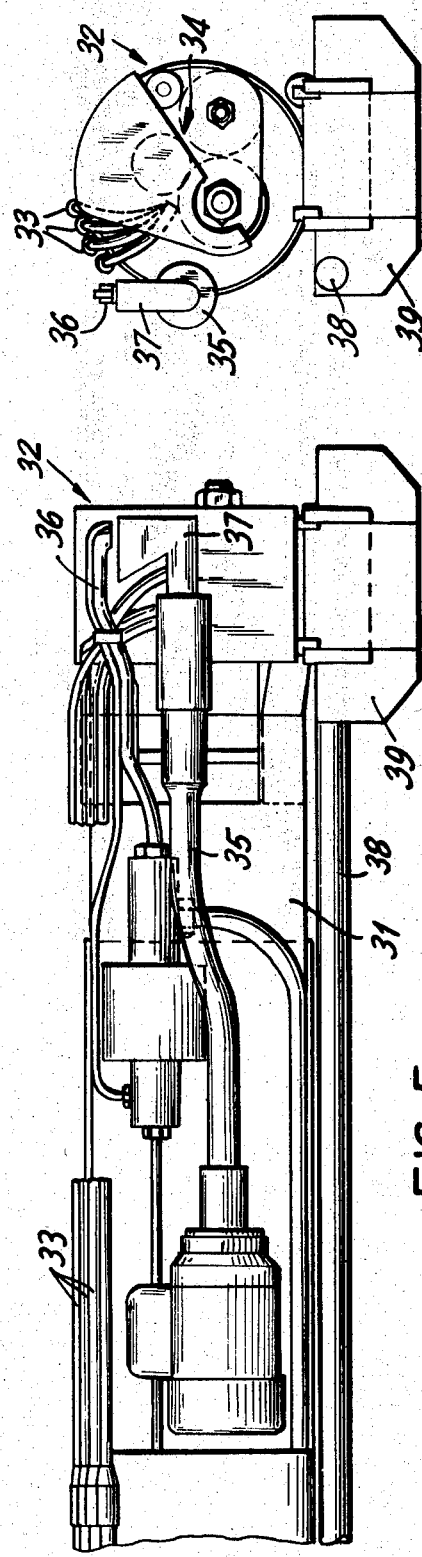
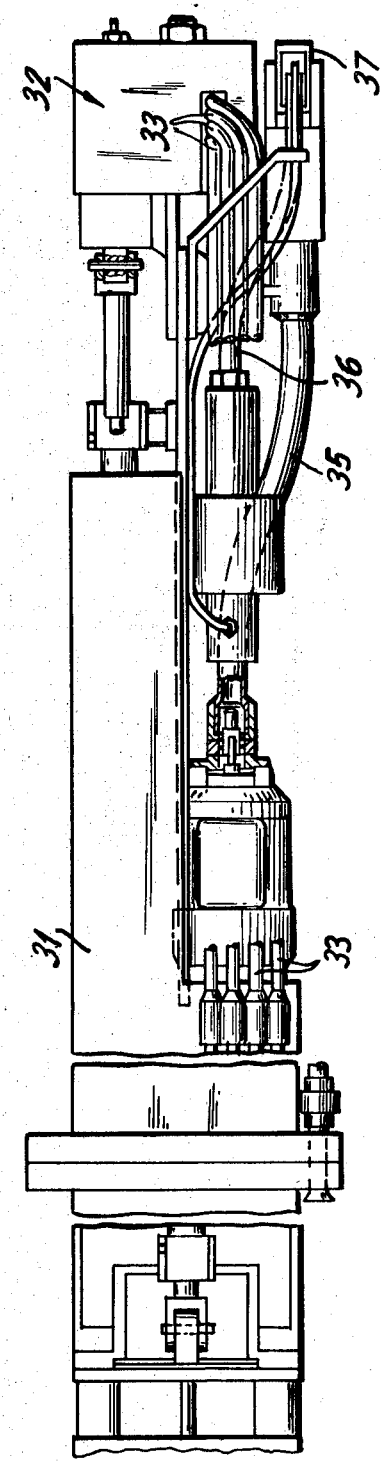
INVENTOR.
WILLY GULDENFELS
BY
McGlew & Toren
ATTORNEYS

United States Patent Office 3,561,059
Patented Feb. 9, 1971

3,561,059
APPARATUS FOR CENTRIFUGALLY MOLDING TUBES OR REINFORCED PLASTIC MATERIAL
Willy Guldenfels, Neu-Allschwil, Switzerland, assignor to Basler Stuckfarberei A.G., Basel, Switzerland
Filed Oct. 10, 1967, Ser. No. 674,178
Claims priority, application Switzerland, Oct. 12, 1966, 14,823/66
Int. Cl. B29c 5/00
U.S. Cl. 18—26
9 Claims

ABSTRACT OF THE DISCLOSURE

Apparatus for centrifugally molding tubes of reinforced plastic material includes one or more rotatably mounted and driven centrifugal molds, arranged with their axes in spaced parallel relation, and a common feed device for the plastic material and the reinforcing material cooperable with each of the molds. The front or feed end of each mold is rotatably supported on roller bearings for limited vertical displacement of the front end of the mold. The opposite or rear end of each mold is provided with a relatively small diameter axle journal supported on a pivotally mounted balance beam by means of ball bearings, the balance beam being pivotally supported on a fixed bearing block.

Means are provided adjacent the rear end of the mold for ejecting the molded product from the mold. The feed device is provided with conduits, connected to sources of the various materials, and with means for selectively mixing and applying the materials to the interior surface of each mold.

BACKGROUND OF THE INVENTION

In known apparatus for centrifugally molding tubes of reinforced plastic material, a centrifugal mold is mounted on two fixed radial bearings and on an axial bearing. The radial bearings are generally in the form of roller bearings. However, due to the relatively large diameter of the centrifugal mold, and its quite considerable weight, high bearing forces occur when the mold is rotated when there are relatively small inaccuracies in production, or deformations caused by heat. Thus, unless the sizes of the bearings are selected to the be very large, troubles frequently occur. Furthermore, in such known apparatus, each centrifugal mold is generally provided with a respective and separate feed device.

SUMMARY OF THE INVENTION

This invention relates to apparatus for producing tubes of reinforced plastic material and, more particularly, to an improved apparatus of this type including at least one horizontal, rotatably mounted and driven centrifugal mold and a feed device movable axially and reciprocally into the mold for feeding plastic and reinforcing material thereto.

In accordance with the present invention, the disadvantages of the prior art are avoided by providing one or more centrifugal molds wherein the front or feed end of each centrifugal mold is movably mounted for limited vertical movement while the other or rear end of each mold has a relatively small diameter axle journal supported on a balance beam by means of ball bearings, the balance beam being pivotally supported on a fixed bearing block in a vertical axial plane through the mold and the axle journal.

Such a support of the centrifugal mold readily adapts itself to all possible inaccuracies or heat expansions of the mold in all planes. The axial forces are absorbed by the ball bearing on the rear end of each mold. The front bearing may be formed, for example, by two lower rollers on fixed axes and an upper roller on a vertically movable axis. However, instead of a roller bearing of this type, a fluid cushion or air cushion bearing also could be provided. The only essential requisite is that limited vertical movability of the centrifugal mold be provided for.

In larger equipment for centrifugally molding tubes of reinforced plastic material, two or more centrifugal molds are generally arranged with their axes in spaced parallel relation, and a separate feed device is provided for co-operation with each mold. In order to reduce the large amount of space needed, and the cost of such equipment, in accordance with the invention it is advantageous to allocate, to a plurality of centrifugal molds, a single common feed device. This feed device is mounted on a carriage which is advantageously movably suspended from a guide extending above the centrifugal molds and transversely of the axes thereof. The feed device which is thus movable transversely of the molds is advantageously connected to the corresponding material supply points through flexible and supple conduits.

Accordingly, an object of the present invention is to provide improved apparatus for centrifugally molding tubes of reinforced plastic material.

Another object of the invention is to provide such an apparatus including at least one rotatable centrifugal mold having its front or feed end rotatably mounted for limited vertical movement and its rear end provided with a relatively small diameter axle journal supported on a balance beam by means of ball bearings and with the balance beam being pivotally supported on a fixed bearing block in a vertical axial plane through the mold and the axle journal.

A further object of the invention is to provide a support for a centrifugal mold which adapts itself to all possible inaccuracies or heat expansions of the mold in all planes.

Still another object of the invention is to provide a support for a centrifugal mold in which the axial forces are absorbed by the ball bearing on the rear end of the centrifugal mold.

A further object of the invention is to provide such apparatus including a plurality of centrifugal molds arranged with their axes in spaced parallel relation and including a single common feed device selectively cooperable with each of the molds.

Yet, another object of the invention is to provide such a molding apparatus in which the single common feed device is mounted on a carriage which is movably suspended from a guide extending above the centrifugal molds and transversely of the axes thereof.

A further object of the invention is to provide such a feed device which is connected to corresponding material supply points through flexible and supple conduits.

BRIEF DESCRIPTION OF THE DRAWINGS

For an understanding of the principles of the invention, reference is made to the following description of a typical embodiment thereof as illustrated in the accompanying drawings.

In the drawings:

FIG. 3 is a view, partly in side elevation and partly in vertical axial section, and to a larger scale, of a single centrifugal mold of the apparatus shown in FIGS. 1 and 2;

FIG. 4 is a front elevation view of the mold shown in FIG. 3;

FIG. 5 is a side elevation view, to a larger scale, of the front part of the feed device of the apparatus shown in FIGS. 1 and 2;

FIG. 6 is a plan view corresponding to FIG. 5; and
FIG. 7 is a front elevation view of the apparatus shown in FIG. 5.

DESCRIPTION OF THE PREFERRED EMBODIMENT

Figure 1:
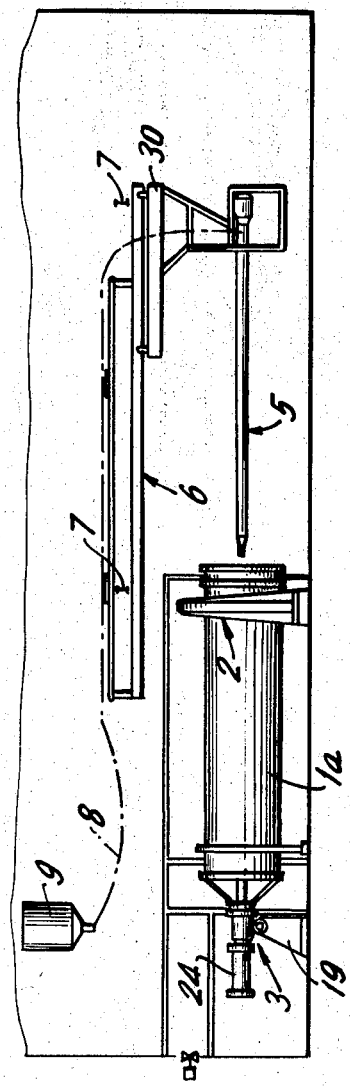
FIG. 1 is a schematic side elevation view of multiple mold apparatus embodying the invention.
Figure 2:
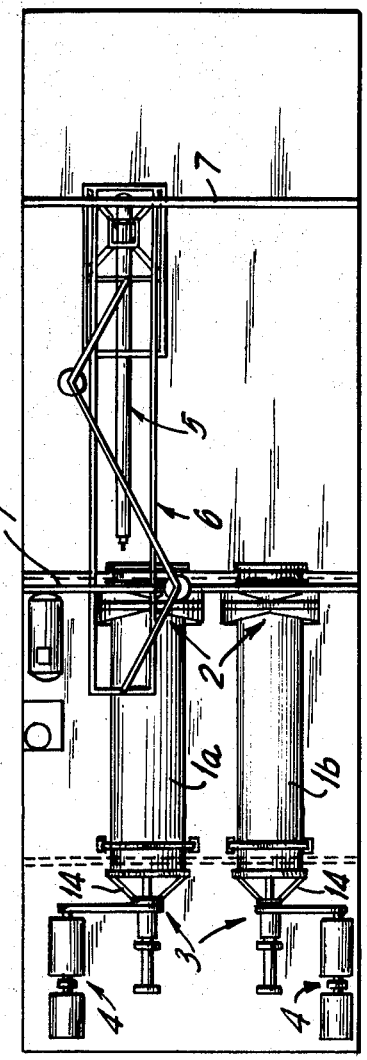
FIG. 2 is a schematic plan view of the apparatus shown in FIG. 1.

Referring to the drawings, the apparatus shown in FIGS. 1 and 2 includes two centrifugal molds 1a and 1b, although the invention is applicable equally to a single mold or to more than two molds. The axes of molds 1a and 1b are in spaced parallel relation, and each mold is supported by a respective front bearing 2 and a respective rear bearing 3. Each mold is mounted for rotation, and is rotatable by a respective drive unit 4. As stated, more than two molds may be provided, and it is not necessary that all the molds be arranged to produce tubes of the same diameter. Thus, and referring to FIG. 2, it will be noted that mold 1a is larger in diameter than mold 1b.

A common feed device 5 is provided for cooperation with both of the centrifugal molds 1a and 1b. Feed device 5 is supported, so as to be axially reciprocable, on a carriage 6 suspended from a guide 7 formed by two profiled rails which may be mounted, for example, on a cover for the apparatus. Guide 7 extends above molds 1a and 1b, transversely of the axes of the molds, and it will be clear that the carriage 6 is movable in both directions transversely of the axes of the molds.

With the arrangement shown in FIGS. 1 and 2, it will be apparent that, due to the elimination of the plurality of separate feed devices, and due to the suspension of the single device from the cover of the apparatus, the apparatus itself is not only less expensive but also the space available, or left free, on the working base, is considerably greater than it would be in apparatus including a plurality of feed devices having carriages mounted on the working base.

In FIG. 1, the feed device is schematically illustrated, at 8, as connected to a supply tank 9 for plastic material, through flexible conduits. Corresponding connections may, of course, also be provided for any desired fillers or for the reinforcing material, such as glass fiber, for example, being used. The compression fluid, such as air, necessary, for example, for injecting glass fibers into the mold also can be conveyed to the feed device 5 in a similar fashion.

The centrifugal mold 1a which, except for its diameter, is the same as the mold 1b, and its associated bearings, are illustrated more clearly in FIGS. 3 and 4. As shown in these figures, the mold includes a cylindrical jacket 10 opened at both ends, and the inner wall of the mold has the desired external shape of the tube to be produced. In the example shown, the tube is to be formed with a front flange of greater thickness and, for this purpose, the bore of jacket 10 of the mold is somewhat increased in diameter at the location of the flange, as indicated at 10a. Jacket 10 is formed on its exterior surface with flangelike reinforcing ribs 11, and the rib 11 located nearest the feed end of the jacket serves as a bearing surface for the front roller bearing 2.

Roller bearing 2 includes two lower rollers 13a and an upper roller 13b, having their axes in substantially parallel relation in bearing block 12 fixed to the apparatus base. The two lower rollers 13a are arranged symmetrically with respect to a vertical axial plane through the mold, and have stationary axes. The upper roller 13b, engaging the upper surface of jacket flange 11, is mounted to move vertically and is spring biased against the bearing surface of flange 11 in any desired manner.

Radial arms 14, which converge obliquely rearwardly, are attached to the other or rear end of jacket 10, and the free ends of these arms carry, coaxially with jacket 10, a drive ring 15 and, radially inside ring 15, a rearwardly projecting tube 16 which is coaxial with drive ring 15. Tube 16 is provided with thickened portions rotatably mounting the tube in a cylindrical attachment 18a of a balance beam 18, by means of ball bearings 17. Balance beam 18 is pivotally mounted in a stationary bearing block 19 beneath the axis of the centrifugal mold and in a vertical plane through this axis.

A piston rod 20 passes through tube 16 and, on the end of rod 20 adjacent centrifugal mold 1a, an axially fixed catch 21 is mounted so as to be rotatable. Rearwardly converging radial arms 22, positioned inside arms 14, diverge outwardly and forwardly from catch 21 and their forward ends have secured thereto a cover plate 23 closing the rear of mold jacket 10. Cover plate 23 also serves as an ejector. Piston rod 20 projects into a cylinder 24 connected to attachment 18a, and it has a piston 25 mounted thereon to cooperate with the cylinder 24. Piston rod 20, and with the piston rod, cover plate 23, may be axially displaced by a pressure medium supplied through conduits 26a and 26b opening into cylinder 24 on opposite sides of piston 25.

FIGS. 5, 6 and 7 illustrate the front part of the feed device 5 shown in FIGS. 1 and 2. The feed device includes a supporting arm 31 provided with a carrier 30 at its rear end, as shown in FIGS. 1 and 2. The free end of supporting arm 31 carries a feed head 32 for delivering the material, such as plastic material, reinforcement material, or filling material, provided for producing the tube. In the illustrated example, a tube reinforced by glass fibers and having a central layer composed of a light filling material is to be produced from a plastic material composed of two substances, namely a resin and a hardener.

The conduits for supplying these materials to the head 32 are led along arm 31. These conduits include a plurality of pipes 33 serving to convey the glass fibers and leading to a mechanical cutting device 34 in head 32, separate conduits 35 or 36 for conveying resin and hardener to a mixing and spraying device 37 in the head 32, and a conduit 38 for feeding filling means to a feed device 39 on head 32. Feed device 39 supplies the materials tangentially to the inner surface of the mold so that all particles of the materials are forced against the cylindrical wall of the mold, resulting in a very uniform delivery. The delivery points for the three materials are located very near each other in the head 32, thus leading to a satisfactory binding of the reinforcing or filling material into the plastic material serving as a binding means, and making possible a uniform application of these materials onto the inner surface of the mold.

The delivery points in the head 32, thus located as near each other as possible, are furthermore advantageously so arranged that not only are they located as closely as possible to the inside surface of the mold, and thus outside the axis of the mold, but also so that their positive direction, such as the spraying direction of the devices 34, 37 and 39, does not extend radially but at as small an angle as possible to the interior wall of the mold.

For producing a tube in one of the two centrifugal molds 1a or 1b, the feed device is first moved transversely on rails 7 until it is axially aligned with the appropriate mold. Then the mold is rotated, whereupon feed device 5 is moved axially by means of slide 30 so that the head 32 is reciprocated into the centrifugal mold. The conduits for the different materials are opened in the desired sequence and for the desired length of time, and the tube is thereby formed by repeated coating and spinning. After the tube has been completed, feed device 5 is retracted from the mold and is now available for feeding the next mold. As soon as the desired rigidity of the formed tube has been attained, rotation of the centrifugal mold can be interrupted and the finished tube can be removed therefrom. For this purpose, cover plate 23 is moved by means of piston rod 20 toward the right, as viewed in FIG. 3, with the edge or peripheral margin of cover plate 23 serving as an ejector for the formed tube.

In the example described above, the filling material is conveyed in a corresponding conduit 38 on feed head 32 to the feed device, and is there delivered through the tangentially distributing feed device 39. Instead of the conduit 38, an endless conveyor belt could also be provided, having guide rollers supported on arm 31, for example, and for the purpose of feeding device 39. Device 39 also could be replaced by any other desired form of delivery device.

The described arrangement of means for feeding resin, reinforcing material and filling material makes it possible to produce so-called sandwich tubes in a centrifugal casting process, and in which a layer of resin with reinforcing lining is first applied to the inner wall of the mold and, directly after this, for example, in the same working step, a resin-bound layer of filling material and then another layer of resin is applied. The thickness of the individual layers may be varied to a wide extent by correspondingly controlling the feed times, or the number of strokes, of the different deliveries of material.

The described apparatus is compact in construction, makes possible, at a relatively low cost, a high production of tubes, occupies relatively little space, and is less susceptible to trouble, particularly due to the mold support used.

While a specific embodiment of the invention has been shown and described in detail to illustrate the application of the principles of the invention, it will be understood that the invention may be embodied otherwise without departing from such principles.

What is claimed is:

1. Apparatus for producing tubes of reinforced plastic materials comprising, in combination, at least one substantially horizontal and rotatably mounted and driven centrifugal mold; a feed device, for the plastic and reinforcing materials, mounted for reciprocation coaxially of said mold; a front bearing rotatably mounting the front feed end of said mold for limited vertical displacement of said front feed end in said front bearing; an axle journal extending from the rear end of the mold in fixed relation and coaxially with the latter and having a diameter which is small compared to the diameter of the mold; a balance beam; a fixed bearing block at said mold rear end pivotally supporting said balance beam for oscillation in a vertical plane intersecting the axis of said axle journal; and ball bearings supporting said axle journal on said balance beam; whereby said mold is oscillatable about the pivot of said balance beam.

2. Apparatus for producing tubes of reinforced plastic material, as claimed in claim 1, in which said front bearing is a roller bearing including two lower bearing rollers rotatable about fixed axes and an upper pressure roller on a vertically movable axis and spring biased into engagement with said mold.

3. Apparatus for producing tubes of reinforced plastic material, as claimed in claim 2, in which said two lower bearing rollers are disposed symmetrically to either side of a vertical axial plane through the mold.

4. Apparatus for producing tubes of reinforced plastic materials comprising, in combination, at least one substantially horizontal and rotatably mounted and driven centrifugal mold; a feed device, for the plastic and reinforcing materials, mounted for reciprocation coaxially of said mold; a front bearing rotatably mounting the front feed end of said mold for limited vertical displacement of said front feed end in said front bearing; an axle journal extending from the rear end of the mold coaxially with the latter and having a diameter which is small compared to the diameter of the mold; a balance beam; a fixed bearing block pivotally supporting said balance beam for oscillation in a vertical plane intersecting the axis of said axle journal; ball bearings supporting said axle journal on said balance beam; and a plurality of rods each connected at one end to the periphery of said mold at the rear end thereof and converging toward each other, the other ends of said rods being connected to said axle journal.

5. Apparatus for producing tubes of reinforced plastic material comprising, in combination, at least one substantially horizontal and rotatably mounted and driven centrifugal mold; a feed device, for the plastic and reinforcing materials, mounted for reciprocation coaxially of said mold; a front bearing rotatably mounting the front feed end of said mold for limited vertical displacement of said front feed end in said front bearing; an axle journal extending from the rear end of the mold coaxially with the latter and having a diameter which is small compared to the diameter of the mold; a balance beam; a fixed bearing block pivotally supporting said balance beam for oscillation in a vertical plane intersecting the axis of said axle journal; ball bearings supporting said axle journal on said balance beam; said axle journal comprising a tubular member; a piston rod extending through said tubular member; a cylinder; a piston at one end of said piston rod and within said cylinder; a cover at the other end of said cylinder rod within the rear end of said mold, said cover serving as an ejector and closing the rear end of said mold; and means mounting said cover plate on said piston rod for rotation relative to the latter but restraining axial displacement of said cover plate relative to said piston rod.

6. Apparatus for producing tubes of reinforced plastic material, as claimed in claim 5, in which said last-named means comprises a catch rotatably mounted on said axle journal, and a plurality of arms connected to said catch and diverging forwardly of the mold, the opposite ends of said arms being connected to said cover plate.

7. Apparatus for producing tubes of reinforced plastic material as claimed in claim 1 including plural centrifugal molds arranged with their axes in spaced substantially parallel relation; a carriage mounted above said centrifugal molds; guide means mounting said carriage for movement transversely of the axes of said molds; a carrier mounted on said carriage for movement therealong parallel to the mold axes; and a single common feed device supported by said carrier for reciprocation into and out of said molds, said feed device supplying all the feed materials required for each tube.

8. Apparatus for producing tubes of reinforced plastic material, as claimed in claim 7, in which said feed device includes an arm supported at one end on said carrier and a head mounted on the free front end of said arm; said head including delivery devices for the material forming the tubes; and flexible conduits having delivery ends connected to said delivery devices and arranged to be connected to supply points for the material for the tube.

9. Apparatus for producing tubes of reinforced plastic material, as claimed in claim 8, in which said delivery devices include delivery devices for resin, reinforcing material and a filling material; the feed of material to the individual delivery devices being controllable during reciprocation of said arm, for producing laminated tubes.

References Cited

UNITED STATES PATENTS

| | | | |
|---|---|---|---|
| 1,303,889 | 5/1919 | Gruenfeld | 25—30C |
| 2,161,968 | 6/1939 | Lyon et al. | 25—30C |
| 2,229,618 | 1/1941 | Abeles et al. | 25—30C |
| Re. 25,587 | 6/1964 | Wiltshire | 18—26X |
| 1,840,027 | 1/1932 | Fetter | 18—26X |
| 2,252,219 | 8/1941 | Trotzke | 18—26UX |
| 2,790,997 | 5/1957 | Kurtz | 18—26 |
| 2,870,054 | 1/1959 | Amos et al. | 18—26X |
| 2,994,919 | 8/1961 | Schafer et al. | 18—26 |
| 3,098,764 | 7/1963 | Kao et al. | 18—26X |
| 3,382,541 | 5/1968 | Campbell | 18—26 |
| 3,134,140 | 5/1964 | Knowles | 18—26 |
| 2,349,213 | 5/1944 | Niekerk | 18—26UX |

J. SPENCER OVERHOLSER, Primary Examiner

U.S. Cl. X.R.

25—30